(12) United States Patent
Basu et al.

(10) Patent No.: US 12,353,723 B2
(45) Date of Patent: Jul. 8, 2025

(54) LOW-POWER BOOT-UP FOR MEMORY SYSTEMS

(71) Applicant: Micron Technology, Inc., Boise, ID (US)

(72) Inventors: Reshmi Basu, Boise, ID (US);
Jonathan S. Parry, Boise, ID (US);
David Aaron Palmer, Boise, ID (US);
Luca Porzio, Casalnuovo (IT);
Giuseppe Cariello, Boise, ID (US);
Stephen Hanna, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 319 days.

(21) Appl. No.: 17/881,294

(22) Filed: Aug. 4, 2022

(65) Prior Publication Data
US 2024/0045596 A1   Feb. 8, 2024

(51) Int. Cl.
*G06F 3/06*   (2006.01)

(52) U.S. Cl.
CPC .......... *G06F 3/0617* (2013.01); *G06F 3/0653* (2013.01); *G06F 3/0679* (2013.01)

(58) Field of Classification Search
None
See application file for complete search history.

(56) References Cited

U.S. PATENT DOCUMENTS

2019/0065752 A1*   2/2019   Li ......................... G06F 15/781

\* cited by examiner

*Primary Examiner* — Michael Alsip
(74) *Attorney, Agent, or Firm* — Holland & Hart LLP

(57) ABSTRACT

Methods, systems, and devices for low-power boot-up for memory systems are described. A memory system may be configured to receive, over a first conductive path of a second communication interface, a first indication to boot-up a memory system and a first communication interface associated with the memory system, wherein the first communication interface includes a plurality of conductive paths; receive, over a second conductive path of the second communication interface, a second indication whether to perform a boot-up operation of the memory system using a low-power mode or a high-power mode based at least in part on receiving the first indication; and boot the memory system according to the low-power mode or the high-power mode based at least in part on receiving the second indication.

25 Claims, 6 Drawing Sheets

LOW-POWER BOOT-UP FOR MEMORY SYSTEMS

FIELD OF TECHNOLOGY

The following relates to one or more systems for memory, including low-power boot-up for memory systems.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Aspects of this disclosure relate to one or more systems for memory, including low-power boot-up for memory systems. Following battery failure, a memory system may not boot-up properly because it receives power below a threshold level used for the normal boot-up process. Attempting to boot-up a memory system following battery failure may trigger a power reset loop condition that may continue indefinitely until the battery is sufficiently charged to meet the power threshold level needed for boot-up. A power reset loop condition may occur when a memory system attempts to boot-up. If the amount of power supplied to the memory system during the boot-up procedure is below a threshold, the memory system may reset the boot-up procedure and attempt to boot-up again. In a low-battery condition, the memory system may enter a loop of attempting the boot-up procedure, determining that the power is below a threshold, aborting the current boot-up procedure, and initiating a new boot-up procedure.

Implementations described herein address the aforementioned shortcomings and other shortcomings by providing and receiving indications to adjust a power mode, a speed mode, or other parameters of the memory system prior to boot-up to allow the memory system to boot-up properly and avoid the power reset loop. Some implementations address ways of providing indications of whether to use high-power or low-power to boot-up the memory system and whether to use high-speed or low-speed to boot-up the memory system, thereby allow the memory system to boot-up with a specified power profile that avoids triggering the power reset loop.

Figure 1:
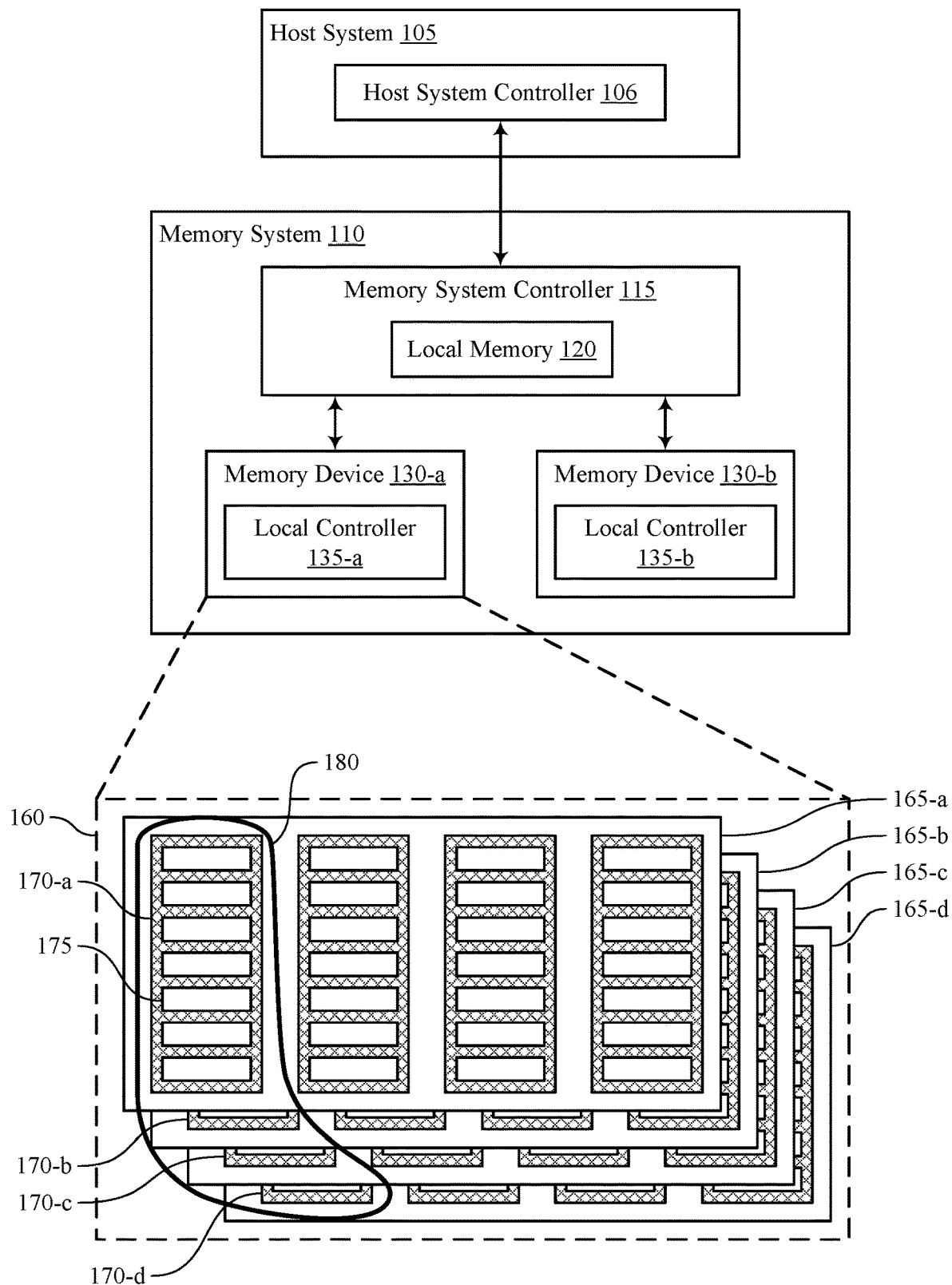
FIG. 1 illustrates an example of a system that supports low-power boot-up for memory systems in accordance with examples as disclosed herein.
Figure 2:
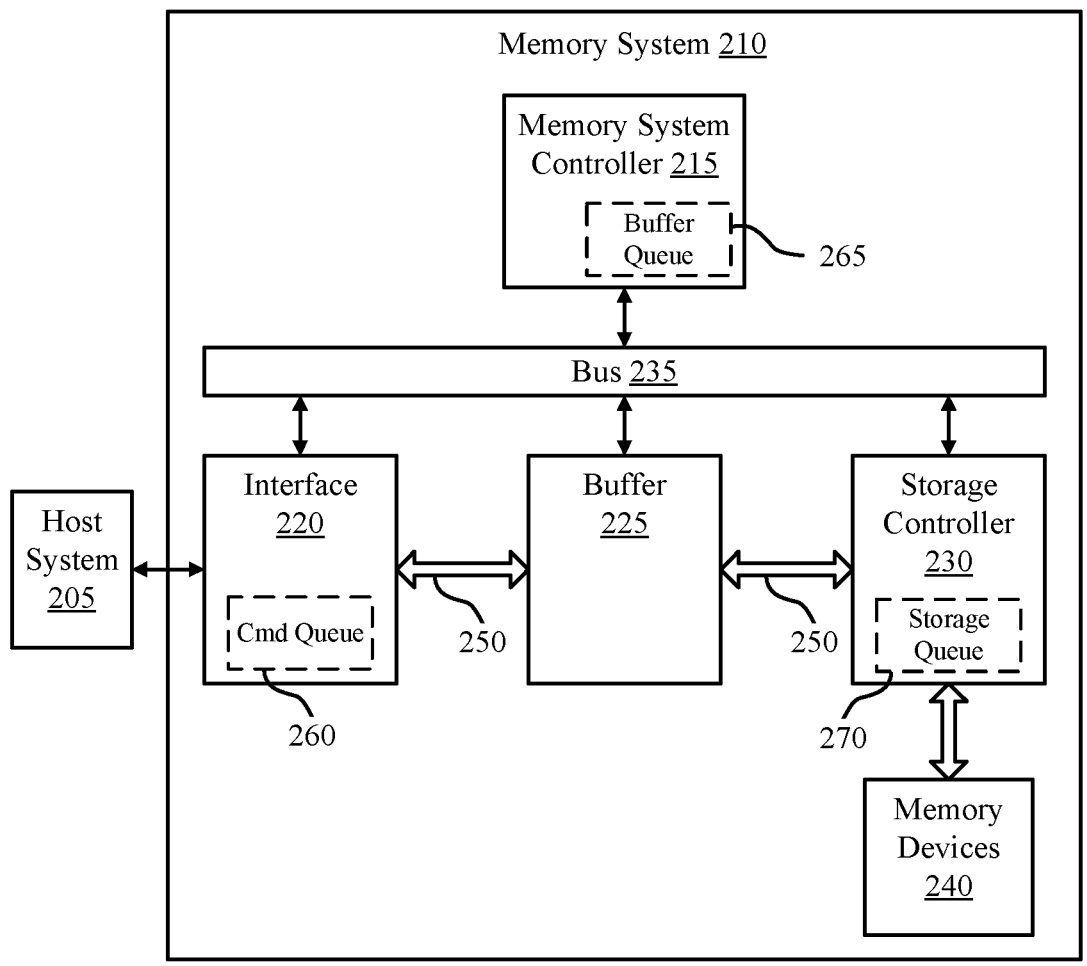
FIG. 2 illustrates an example of a system that supports low-power boot-up for memory systems in accordance with examples as disclosed herein.

Features of the disclosure are initially described in the context of systems, devices, and circuits with reference to FIGS. 1 through 2. Features of the disclosure are described in the context of methods, systems, devices, and circuits with reference to FIGS. 3 through 6. These and other features of the disclosure are further illustrated by and described in the context of apparatus diagrams, system diagrams, and flowcharts that relate to low-power boot-up for memory systems with reference to FIGS. 1 through 6.

FIG. 1 illustrates an example of a system 100 that supports low-power boot-up for memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support low-power boot-up for memory systems. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may support low-power boot-up for memory systems in accordance with examples disclosed herein. In some instances, a power source may not provide enough current (e.g., power) to support normal boot-up procedure (e.g., a 800 milliamp (ma) boot-up procedure). For example, a battery may lose some of its charge and be unable to provide current to support an 800 ma boot-up. In such examples, the memory system 110 may receive an indication to boot-up in a low power mode. The memory system 110 may then use the low power mode to boot-up (e.g., a 500 ma boot-up procedure). In this manner, the memory system 110 may avoid entering a power reset loop condition that may continue indefinitely until the battery is sufficiently charged to support a normal boot-up procedure.

FIG. 2 illustrates an example of a system 200 that supports low-power boot-up for memory systems in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

The memory system 210 may support low-power boot-up for memory systems in accordance with examples disclosed herein. The memory system 210 may receive indications to adjust a power mode, a speed mode, or other parameters of the memory system prior to boot-up to allow the memory system to boot-up properly and avoid a power reset loop. The memory system 210 may receive indications of whether to use high-power or low-power to boot and whether to use high-speed or low-speed to boot, thereby allowing the memory system 210 to boot-up with a power profile that avoids triggering a power reset loop.

In some examples, a power source may be configured to provide the memory system 210 an amount of power that is below a threshold associated with a standard boot-up procedure (e.g., less than 800 ma). A normal boot-up procedure for a memory system 210 may use, for example 800 ma. If the systems and methods disclosed herein are not implemented, when the memory system 210 is booted up on using less than the threshold amount of power, the voltage may drop, which may trigger a reset and the memory system 210 may restart. The memory system 210 may attempt to boot-up again, the voltage may drop again and trigger a reset again, thereby creating a loop that may continue indefinitely until the power source provides the 800*ma* to allow it to boot. Such cycling between initiating boot-up procedures and resetting the boot-up procedures may be referred to as a power reset loop.

The memory system 210 may avoid the power reset loop by influencing parameters at boot-up so that the memory system 210 may boot-up using lower current, such as 500*ma*. For example, a general-purpose input/output (GPIO) pin, may inform an application specific integrated circuit (ASIC) to boot-up in a low-speed mode and a low-power mode so the memory system 210 can boot-up and avoid the power reset cycle. For example, a signal communicated over a vendor specific function (VSF) pin may be used to indicate whether to start the memory system 210 in a low-power mode or high-power mode. In some examples, a signal communicated over a link startup speed (LSS) pin may be used to indicate whether to start the memory system 210 in a low-speed mode or a high-speed mode. In some examples, a VSF and an LSS may be used together to enable specified power profiles. When the memory system 210 is booted in the low-power mode, performance parameters may be adjusted. For example, CPU clock speed and communication channels may be reduced.

Figure 3:
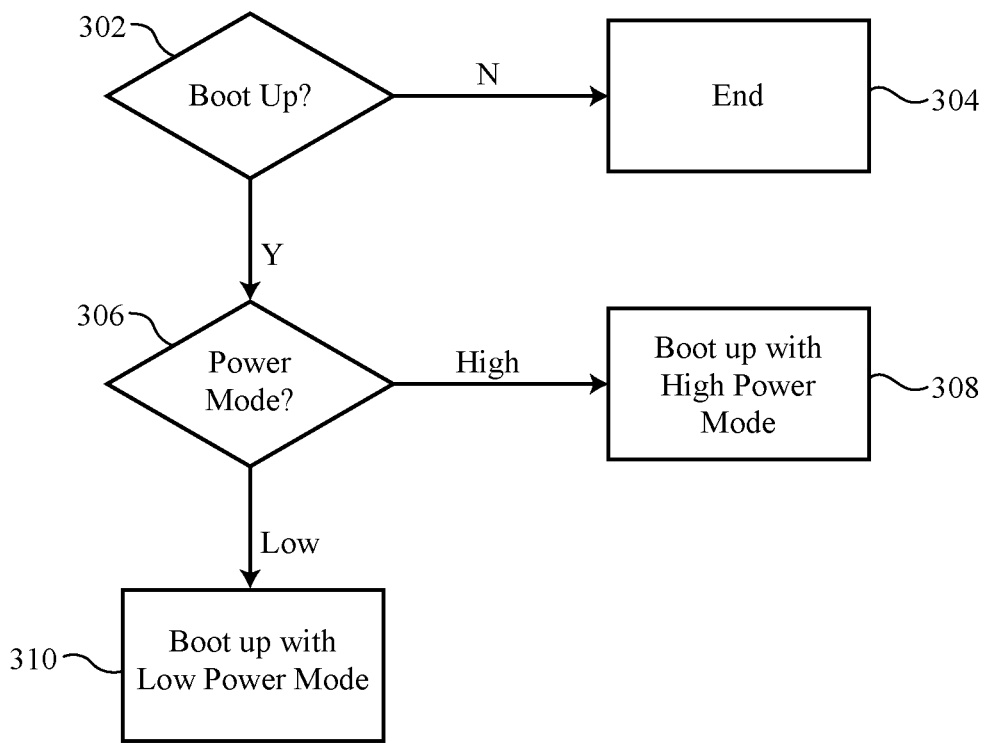
FIG. 3 illustrates an example of a method that supports low-power boot-up for memory systems in accordance with examples as disclosed herein.

FIG. 3 shows a flowchart illustrating an example of a method 300 that supports low-power boot-up for memory systems in accordance with examples as disclosed herein. The operations of method 300 may be implemented by a memory system or its components as described herein. For example, the operations of method 300 may be performed by a memory system as described with reference to FIGS. 1 and 2. In some examples, a memory system may execute a set of instructions to control the functional elements of the device to perform the described functions. Additionally, or alternatively, the memory system may perform aspects of the described functions using special-purpose hardware.

At 302, the method may include receiving, over a first conductive path, a first indication to boot-up a memory system and a communication interface associated with the memory system, the communication interface including a plurality of conductive paths. The operations of 302 may be performed in accordance with examples as disclosed herein. If the first indication is received, the memory system may initiate boot-up at 306. If the first indication is not received, the method 300 may end at 304.

At 306, the method may include receiving, over a second conductive path, a second indication whether to perform a boot-up operation of the memory system using a low-power mode or a high-power mode, based at least in part on receiving the first indication at 302. At 306, if the second indication indicates to perform a boot-up operation of the memory system using a low-power mode, the memory system may be booted according to the low-power mode at 310. At 306, if the second indication indicates to perform a boot-up operation of the memory system using a high-power mode, the memory system may be booted according to the high-power mode at 308.

Figure 4:
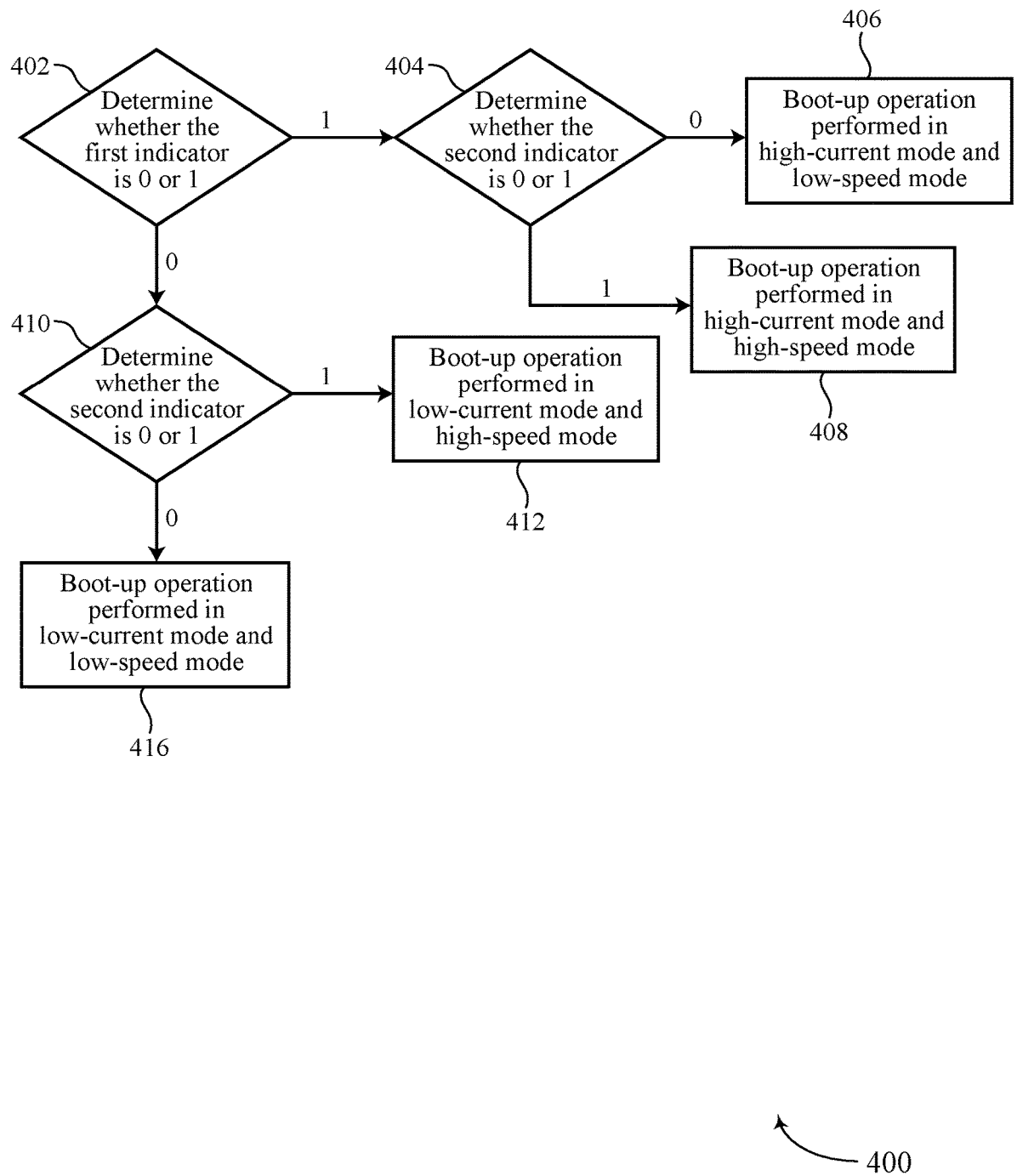
FIG. 4 illustrates an example of a method that supports low-power boot-up for memory systems in accordance with examples as disclosed herein.

FIG. 4 illustrates an example of a method 400 that supports low-power boot-up for memory systems in accordance with examples as disclosed herein. The operations of method 400 may be implemented by a memory system or its components as described herein. For example, the operations of method 400 may be performed by a memory system as described with reference to FIGS. 1 and 2. In some examples, a memory system may execute a set of instructions to control the functional elements of the device to perform the described functions. Additionally, or alternatively, the memory system may perform aspects of the described functions using special-purpose hardware.

The operations of method 400 may be performed in accordance with examples as disclosed herein. In some examples, a system as described herein may include a first communication interface (e.g., an ONFI interface) between a host system and a memory system and a second communication interface (e.g., a UFS interface) between the host system and the memory system. The communication interfaces may use conductive paths that may include hardware pins. For example, the second communication interface of a system may include a VSF pin and/or a LSS pin. In some examples, the conductive path may include a VSF pin for communicating whether to perform the boot-up operation in the low-power mode or the high-power mode and/or an LSS pin for communicating whether to perform the boot-up operation in a low-speed mode or high-speed mode.

During operation of a memory system, the host system and the memory system may exchange information using an ONFI interface. The ONFI interface may be a high-speed interface capable of transferring large amounts of information relatively quickly. During portions of a boot-up procedure of the system, the ONFI interface may not yet be available for use. In some cases, booting-up the ONFI interface may be part of booting-up the memory system.

During a boot-up procedure, the host system may apply power to the memory system, which may then initiate its boot-up procedure. During some portions of the boot-up procedure, the host system may be capable of sending signals to the memory system using conductive paths of a UFS interface, but it may not be capable of communicating information over the ONFI interface. If the boot-up procedure resets during such a portion of the boot-up procedure, the memory system may experience a power reset loop. During such portions the host system may not be configured to communicate information to the memory system to avoid or mitigate a likelihood of a power reset loop. Conductive paths of the UFS interface may be configured to communicate information or communicate commands to the memory system about the types of boot-up procedures to perform. Having a configurable boot-up procedure may reduce a likelihood of experience a power reset loop and increase a likelihood of successfully booting-up the memory system.

The method may include receiving, over a conductive path of the UFS interface, an indication to boot-up a memory system and the ONFI communication interface associated with the memory system using different modes. For example, the indication may indicate whether to boot-up in a low-power mode or a high-power mode. The indication may also indicate whether to boot-up in a low-speed mode or high-speed mode.

The indication of the different modes may be communicated in different ways over different conductive paths. In some examples, the indication may indicate whether to boot-up using a low-power mode or a high-power mode using a single conductive path (e.g., a VSF conductive path sometimes referred to as a VSF pin). In such examples, the signal carried over the conductive path may be modulated using a modulation scheme that includes two states (e.g., a high state and a low state).

In some examples, the indication may indicate whether to boot-up using a low-power mode or a high-power mode and a low-speed mode or a high-speed mode using two conductive paths (e.g., a VSF conductive path and an LSS conductive path). In such examples, two signals may be communicated over the two conductive paths. A VSF conductive path may carry a first signal indicating whether to boot-up the memory system using the low-power mode or the high-power mode and an LSS conductive may carry a second signal indicating whether to boot-up the memory system using the low-speed mode or the high-speed mode. The signals carried over the conductive paths may be modulated using a modulation scheme that includes two states (e.g., a high state and a low state).

In some examples, the indication may indicate whether to boot-up using a low-power mode or a high-power mode and a low-speed mode or a high-speed mode using one conductive path (e.g., a VSF conductive path or an LSS conductive path). In such examples, a single signals may be communicated over the single conductive path. For instance, a VSF conductive path may carry a signal indicating whether to boot-up the memory system using the low-power mode or the high-power mode and indicating whether to boot-up the memory system using the low-speed mode or the high-speed mode. The signal carried over the conductive path may be modulated using a modulation scheme that includes three or more states (e.g., a high state, a low state, and one or more intermediate states).

A VSF conductive path may be a path of the UFS interface that may be configurable for different functions (e.g., by a vendor of the UFS device). In some cases, a VSF conductive path may perform different functions and different parts of the operation of the memory system. In some examples, the indicator may be a VSF indicator for different boot-up states. The boot-up states carried by the VSF conductive path may include a high-power mode and low-power mode indicated by a 1 or a 0, respectively. In some examples, the indicator may be a LSS indicator for different boot-up states. The boot-up states carried by the LSS conductive path may include a high-speed mode and low-speed mode indicated by a 1 or a 0, respectively.

In the low-power mode for boot-up, the memory system may perform operations to reduce the power consumption of the device during the boot-up procedure. Some of the operations may increase the latency of the boot-up procedure. Examples of the operations that may be performed during a boot-up procedure as part of the low-power mode different than the operations of the high-power mode may include: loading some portions of boot-up code from a non-volatile storage device (e.g., NAND device) at different times, delay the execution of some aspects of the firmware, a speed of a clock associated with the memory system may be reduced, a communication rate of the ONFI channel may be reduced, the quantity of non-volatile memory devices being accessed at one time may be reduced, reduce the parallelism of communication interfaces, perform operations or communications in a serial manner rather than a parallel manner, operate one or more low dropout regulators at reduced powers, error control engines may be operated in a lower capability mode, or any combination thereof.

The low-speed mode and the high-speed mode may refer to the speed that information is communicated over the ONFI interface during the boot-up procedure. It may be desirable to boot-up the memory system using the high-speed mode and the low-power mode due to different latency considerations and power considerations. If the indication indicates to boot-up in a low-speed mode, the speed of the ONFI interface may be reduced during the boot-up procedure. Otherwise the speed of the ONFI interface may be a normal speed.

At 402, it may be determined whether the first indicator (e.g., communicated over a VSF conductive path) is 0 or 1, for example. If the first indicator is 0, at 410 it may be determined whether a second indicator (e.g., communicated over a LSS conductive path) is 0 or 1. If the first indicator is 0 and the second indicator is 0, at 416 the boot-up operation is performed in a low-current mode and a low-speed mode. If the first indicator is 0 and the second indicator is 1, at 412 the boot-up operation is performed in a low-current mode and a high-speed mode.

At 402, if the first indicator is 1, at 404 it may be determined whether the second indicator is 0 or 1. If the first indicator is 1 and the second indicator is 1, at 408 the boot-up operation is performed in a high-current mode and high-speed mode. If the first indicator is 1 and the second indicator is 0, at 406 the boot-up operation is performed in a high-current mode and a low-speed mode.

Figure 5:
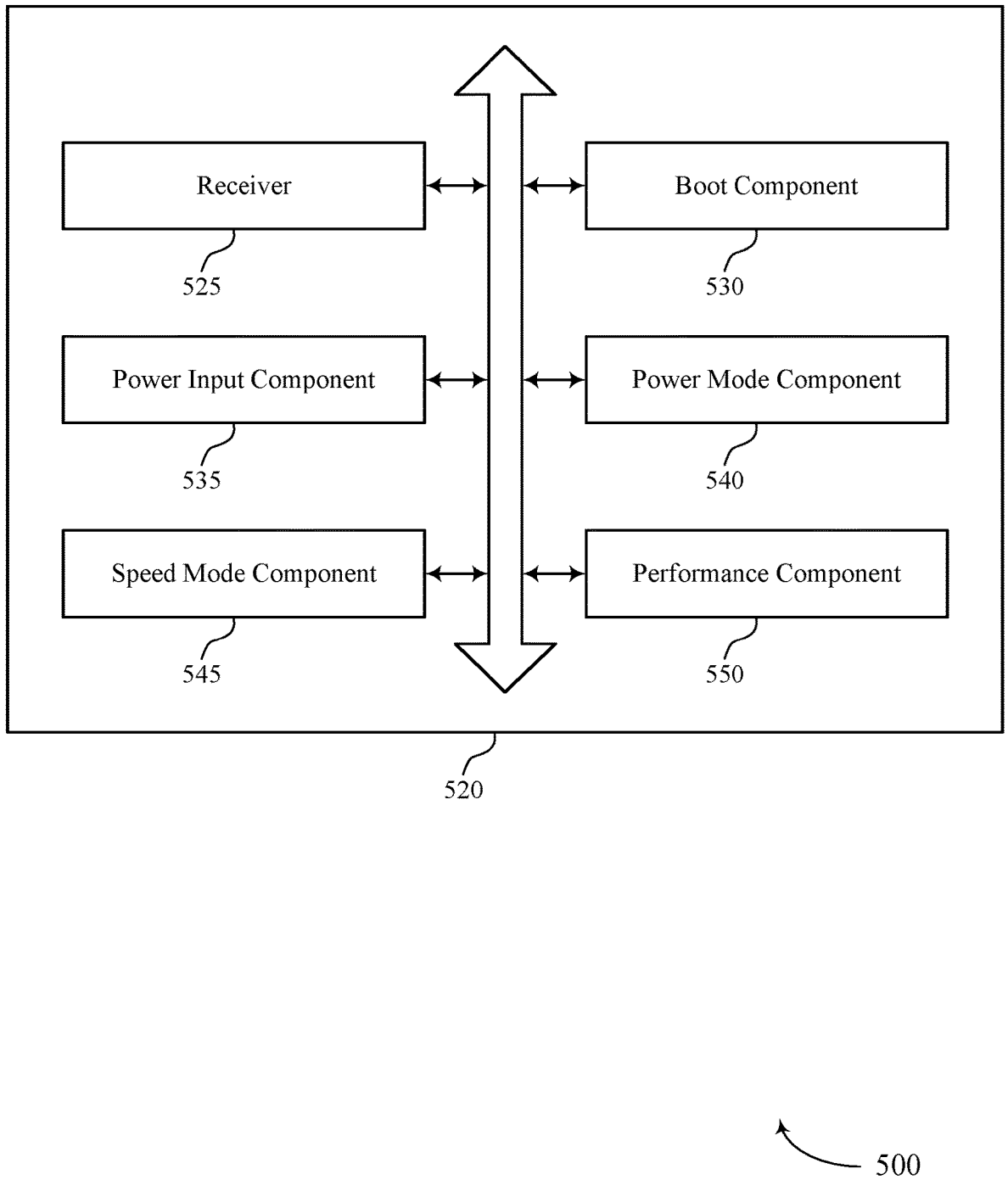
FIG. 5 shows a block diagram of a memory system that supports low-power boot-up for memory systems in accordance with examples as disclosed herein.

FIG. 5 shows a block diagram 500 of a memory system 520 that supports low-power boot-up for memory systems in accordance with examples as disclosed herein. The memory system 520 may be an example of aspects of a memory system as described with reference to FIGS. 1 through 4. The memory system 520, or various components thereof, may be an example of means for performing various aspects of low-power boot-up for memory systems as described herein. For example, the memory system 520 may include a receiver 525, a boot component 530, a power input component 535, a power mode component 540, a speed mode component 545, a performance component 550, or any combination thereof. Each of these components may communicate, directly or indirectly, with one another (e.g., via one or more buses).

The receiver 525 may be configured as or otherwise support a means for receiving, over a first conductive path, a first indication to boot-up a memory system and a communication interface associated with the memory system, the communication interface including a plurality of conductive paths. In some examples, the receiver 525 may be configured as or otherwise support a means for receiving, over a second conductive path, a second indication whether to perform a boot-up operation of the memory system using a low-power mode or a high-power mode based at least in part on receiving the first indication. The boot component 530 may be configured as or otherwise support a means for booting the memory system according to the low-power mode or the high-power mode based at least in part on receiving the second indication.

In some examples, the power input component 535 may be configured as or otherwise support a means for monitoring a power input of the memory system. In some examples, the power input component 535 may be configured as or otherwise support a means for determining whether the power input satisfies a threshold. In some examples, the power mode component 540 may be configured as or otherwise support a means for switching from the low-power mode to the high-power mode based at least in part on the power input satisfying the threshold.

In some examples, the second indication indicates whether to perform the boot-up operation of the memory system using a low-speed mode or a high-speed mode. In some examples, booting the memory system is performed according to the low-speed mode or the high-speed mode based at least in part on receiving the second indication.

In some examples, the second indication indicates to perform the boot-up operation using the low-power mode and the low-speed mode. In some examples, where the memory system is booted according to the low-power mode and the low-speed mode.

In some examples, the second indication indicates to perform the boot-up operation using the high-power mode. In some examples, the memory system is booted according to the high-power mode and the high-speed mode.

In some examples, the power input component 535 may be configured as or otherwise support a means for monitoring a power input of the memory system. In some examples, the power input component 535 may be configured as or otherwise support a means for determining whether the power input satisfies a threshold. In some examples, the power mode component 540 may be configured as or otherwise support a means for switching from the low-power mode to the high-power mode and from the low-speed mode to the high-speed mode based at least in part on the power input satisfying the threshold.

In some examples, the speed mode component 545 may be configured as or otherwise support a means for receiving, over a third conductive path, a third indication whether to perform the boot-up operation of the memory system using a low-speed mode or a high-speed mode based at least in part on receiving the first indication, where booting the memory system is performed according to the low-speed mode or the high-speed mode based at least in part on receiving the third indication.

In some examples, the second indication indicates to perform the boot-up operation using the low-power mode. In some examples, the third indication indicates to perform the boot-up operation using the low-speed mode. In some examples, the memory system is booted according to the low-power mode and the low-speed mode based at least in part on the second indication and the third indication.

In some examples, the second indication indicates to perform the boot-up operation using the high-power mode. In some examples, the third indication indicates to perform the boot-up operation using the high-speed mode. In some examples, the memory system is booted according to the high-power mode and the high-speed mode based at least in part on the second indication and the third indication.

In some examples, the power input component 535 may be configured as or otherwise support a means for monitoring a power input of the memory system. In some examples, the power input component 535 may be configured as or otherwise support a means for determining whether the power input satisfies a threshold. In some examples, the boot component 530 may be configured as or otherwise support a means for switching from the low-power mode to the high-power mode and from the low-speed mode to the high-speed mode based at least in part on the power input satisfies the threshold.

In some examples, the first conductive path is coupled with a power supply configured to provide the first indication.

In some examples, the power supply includes a voltage common collector (VCC) pin.

In some examples, the memory system includes an integrated circuit configured to receive the first indication and the second indication.

In some examples, the integrated circuit includes an ASIC.

In some examples, the first communication interface includes an ONFI and the second communication interface comprises a UFS interface.

In some examples, the second conductive path includes a GPIO pin.

In some examples, the second conductive path includes a VSF pin.

In some examples, the second conductive path includes a LSS pin.

In some examples, the high-power mode includes booting-up the memory system using a power budget that is greater than 500 mA.

In some examples, the high-power mode includes booting-up the memory system using a power budget that is greater than 800 mA.

In some examples, the low-power mode includes booting-up the memory system using a power budget that is less than or equal to 500 mA.

In some examples, the performance component 550 may be configured as or otherwise support a means for adjusting a performance parameter of a plurality of performance parameters of the memory system in response to the memory system being booted according to the low-power mode.

In some examples, the plurality of performance parameters includes a clock speed and a communication rate associated with the communication interface.

In some examples, adjusting the performance parameter further includes reducing the clock speed and the communication rate.

Figure 6:
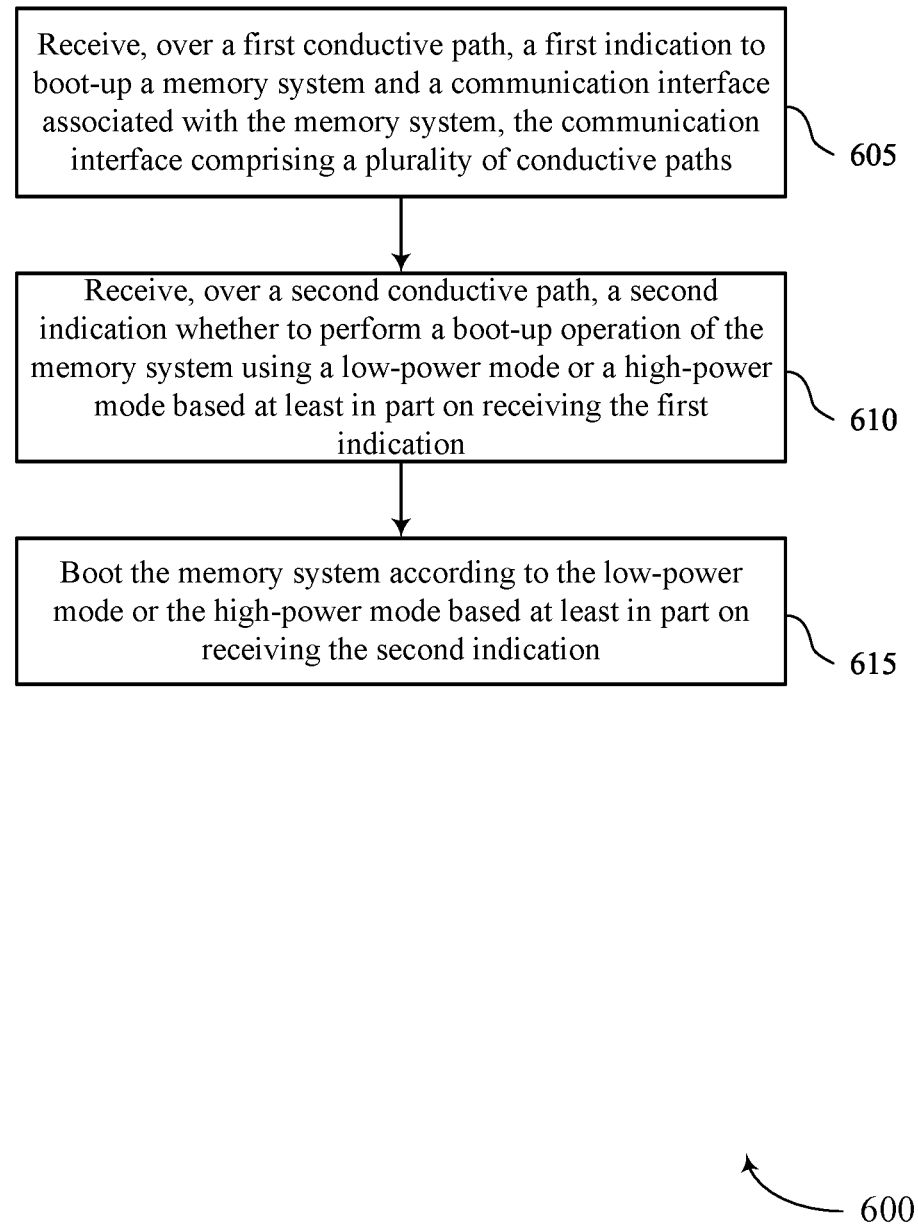
FIG. 6 shows a flowchart illustrating a method or methods that support low-power boot-up for memory systems in accordance with examples as disclosed herein.

FIG. 6 shows a flowchart illustrating a method 600 that supports low-power boot-up for memory systems in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving, over a first conductive path, a first indication to boot-up a memory system and a communication interface associated with the memory system, the communication interface including a plurality of conductive paths. The operations of 605 may be performed in accordance with examples as disclosed herein. In some examples, aspects of the operations of 605 may be performed by a receiver 525 as described with reference to FIG. 5.

At 610, the method may include receiving, over a second conductive path, a second indication whether to perform a boot-up operation of the memory system using a low-power mode or a high-power mode based at least in part on receiving the first indication. The operations of 610 may be performed in accordance with examples as disclosed herein. In some examples, aspects of the operations of 610 may be performed by a receiver 525 as described with reference to FIG. 5.

At 615, the method may include booting the memory system according to the low-power mode or the high-power mode based at least in part on receiving the second indication. The operations of 615 may be performed in accordance with examples as disclosed herein. In some examples, aspects of the operations of 615 may be performed by a boot component 530 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, over a first conductive path of a second communication interface, a first indication to boot-up a memory system and a first communication interface associated with the memory system, the first communication interface including a plurality of conductive paths; receiving, over a second conductive path of the second communication interface, a second indication whether to perform a boot-up operation of the memory system using a low-power mode or a high-power mode based at least in part on receiving the first indication; and booting the memory system according to the low-power mode or the high-power mode based at least in part on receiving the second indication.

Aspect 2: The method, apparatus, or non-transitory computer-readable medium of aspect 1, further including operations, features, circuitry, logic, means, or instructions, or any combination thereof for monitoring a power input of the memory system; determining whether the power input satisfies a threshold; and switching from the low-power mode to the high-power mode based at least in part on the power input satisfying the threshold.

Aspect 3: The method, apparatus, or non-transitory computer-readable medium of any of aspects 1 through 2 where the second indication indicates whether to perform the boot-up operation of the memory system using a low-speed mode or a high-speed mode and booting the memory system is performed according to the low-speed mode or the high-speed mode based at least in part on receiving the second indication.

Aspect 4: The method, apparatus, or non-transitory computer-readable medium of aspect 3 where the second indication indicates to perform the boot-up operation using the low-power mode and the low-speed mode and where the memory system is booted according to the low-power mode and the low-speed mode.

Aspect 5: The method, apparatus, or non-transitory computer-readable medium of any of aspects 3 through 4 where the second indication indicates to perform the boot-up operation using the high-power mode and the memory system is booted according to the high-power mode and the high-speed mode.

Aspect 6: The method, apparatus, or non-transitory computer-readable medium of any of aspects 3 through 5, further including operations, features, circuitry, logic, means, or instructions, or any combination thereof for monitoring a power input of the memory system; determining whether the power input satisfies a threshold; and switching from the low-power mode to the high-power mode and from the low-speed mode to the high-speed mode based at least in part on the power input satisfying the threshold.

Aspect 7: The method, apparatus, or non-transitory computer-readable medium of any of aspects 1 through 6, further including operations, features, circuitry, logic, means, or instructions, or any combination thereof for receiving, over a third conductive path, a third indication whether to perform the boot-up operation of the memory system using a low-speed mode or a high-speed mode based at least in part on receiving the first indication, where booting the memory system is performed according to the low-speed mode or the high-speed mode based at least in part on receiving the third indication.

Aspect 8: The method, apparatus, or non-transitory computer-readable medium of aspect 7 where the second indication indicates to perform the boot-up operation using the low-power mode; the third indication indicates to perform the boot-up operation using the low-speed mode; and the memory system is booted according to the low-power mode and the low-speed mode based at least in part on the second indication and the third indication.

Aspect 9: The method, apparatus, or non-transitory computer-readable medium of any of aspects 7 through 8 where the second indication indicates to perform the boot-up operation using the high-power mode; the third indication indicates to perform the boot-up operation using the high-speed mode; and the memory system is booted according to the high-power mode and the high-speed mode based at least in part on the second indication and the third indication.

Aspect 10: The method, apparatus, or non-transitory computer-readable medium of any of aspects 7 through 9, further including operations, features, circuitry, logic, means, or instructions, or any combination thereof for monitoring a power input of the memory system; determining whether the power input satisfies a threshold; and switching from the low-power mode to the high-power mode and from the low-speed mode to the high-speed mode based at least in part on the power input satisfies the threshold.

Aspect 11: The method, apparatus, or non-transitory computer-readable medium of any of aspects 1 through 10 where the first conductive path is coupled with a power supply configured to provide the first indication.

Aspect 12: The method, apparatus, or non-transitory computer-readable medium of aspect 11 where the power supply includes a VCC pin.

Aspect 13: The method, apparatus, or non-transitory computer-readable medium of any of aspects 1 through 12 where the memory system includes an integrated circuit configured to receive the first indication and the second indication.

Aspect 14: The method, apparatus, or non-transitory computer-readable medium of aspect 13 where the integrated circuit includes an ASIC.

Aspect 15: The method, apparatus, or non-transitory computer-readable medium of any of aspects 1 through 14 where the first communication interface includes an ONFI and the second communication interface comprises a UFS interface.

Aspect 16: The method, apparatus, or non-transitory computer-readable medium of any of aspects 1 through 15 where the second conductive path includes a GPIO pin.

Aspect 17: The method, apparatus, or non-transitory computer-readable medium of any of aspects 1 through 16 where the second conductive path includes a VSF pin.

Aspect 18: The method, apparatus, or non-transitory computer-readable medium of any of aspects 1 through 17 where the second conductive path includes a LSS pin.

Aspect 19: The method, apparatus, or non-transitory computer-readable medium of any of aspects 1 through 18 where the high-power mode includes booting-up the memory system using a power budget that is greater than 500 mA.

Aspect 20: The method, apparatus, or non-transitory computer-readable medium of any of aspects 1 through 19 where the high-power mode includes booting-up the memory system using a power budget that is greater than 800 mA.

Aspect 21: The method, apparatus, or non-transitory computer-readable medium of any of aspects 1 through 20 where the low-power mode includes booting-up the memory system using a power budget that is less than or equal to 500 mA.

Aspect 22: The method, apparatus, or non-transitory computer-readable medium of any of aspects 1 through 21, further including operations, features, circuitry, logic, means, or instructions, or any combination thereof for adjusting a performance parameter of a plurality of performance parameters of the memory system in response to the memory system being booted according to the low-power mode.

Aspect 23: The method, apparatus, or non-transitory computer-readable medium of aspect 22 where the plurality of performance parameters includes a clock speed and a communication rate associated with the first communication interface.

Aspect 24: The method, apparatus, or non-transitory computer-readable medium of aspect 23 where adjusting the performance parameter further includes reducing the clock speed and the communication rate.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   a first communication interface comprising a plurality of conductive paths;
   a second communication interface comprising a first conductive path and a second conductive path; and
   a controller associated with the memory system, wherein the controller is configured to cause the memory system to:
   receive, over the first conductive path, a first indication to boot-up the memory system and the first communication interface associated with the memory system;
   receive, over the second conductive path, a second indication of whether to perform a boot-up operation of the memory system using a low-power mode or a high-power mode based at least in part on receiving the first indication, wherein a value of the second indication is based least in part on whether a charge state of a power supply is sufficient to activate the memory system and the first communication interface in the high-power mode, and wherein receiving the second indication over the second conductive path of the second communication interface instead of the first communication interface prevents the memory system from entering a power reset loop when the charge state of the power supply is insufficient to activate the first communication interface in the high-power mode; and boot the memory system according to the low-power mode or the high-power mode based at least in part on receiving the second indication.

2. The memory system of claim 1, wherein the controller is further configured to cause the memory system to:
monitor a power input of the memory system;
determine whether the power input satisfies a threshold; and
switch from the low-power mode to the high-power mode based at least in part on the power input satisfying the threshold.

3. The memory system of claim 1, wherein:
the second indication indicates whether to perform the boot-up operation of the memory system using a low-speed mode or a high-speed mode; and
booting the memory system is performed according to the low-speed mode or the high-speed mode based at least in part on receiving the second indication.

4. The memory system of claim 3, wherein:
the second indication indicates to perform the boot-up operation using the low-power mode and the low-speed mode, and
the memory system is booted according to the low-power mode and the low-speed mode.

5. The memory system of claim 3, wherein:
the second indication indicates to perform the boot-up operation using the high-power mode; and
the memory system is booted according to the high-power mode and the high-speed mode.

6. The memory system of claim 3, wherein the controller is further configured to cause the memory system to:
monitor a power input of the memory system;
determine whether the power input satisfies a threshold; and
switch from the low-power mode to the high-power mode and from the low-speed mode to the high-speed mode based at least in part on the power input satisfying the threshold.

7. The memory system of claim 1, wherein the controller is further configured to cause the memory system to:
receive, over a third conductive path, a third indication whether to perform the boot-up operation of the memory system using a low-speed mode or a high-speed mode based at least in part on receiving the first indication, wherein booting the memory system is performed according to the low-speed mode or the high-speed mode based at least in part on receiving the third indication.

8. The memory system of claim 7, wherein:
the second indication indicates to perform the boot-up operation using the low-power mode;
the third indication indicates to perform the boot-up operation using the low-speed mode; and
the memory system is booted according to the low-power mode and the low-speed mode based at least in part on the second indication and the third indication.

9. The memory system of claim 7, wherein:
the second indication indicates to perform the boot-up operation using the high-power mode;
the third indication indicates to perform the boot-up operation using the high-speed mode; and the memory system is booted according to the high-power mode and the high-speed mode based at least in part on the second indication and the third indication.

10. The memory system of claim 7, wherein the controller is further configured to cause the memory system to:
monitor a power input of the memory system;
determine whether the power input satisfies a threshold; and
switch from the low-power mode to the high-power mode and from the low-speed mode to the high-speed mode based at least in part on the power input satisfies the threshold.

11. The memory system of claim 1, wherein:
the first conductive path is coupled with the power supply, wherein the power supply is configured to provide the first indication.

12. The memory system of claim 11, wherein the power supply comprises a voltage common collector (VCC) pin.

13. The memory system of claim 1, wherein:
the memory system comprises an integrated circuit configured to receive the first indication and the second indication.

14. The memory system of claim 13, wherein the integrated circuit comprises an application-specific integrated circuit (ASIC).

15. The memory system of claim 1, wherein:
the first communication interface comprises an open NAND flash interface (ONFI), and
the second communication interface comprises a universal flash system (UFS) interface.

16. The memory system of claim 1, wherein the second conductive path comprises a general-purpose input/output (GPIO) pin.

17. The memory system of claim 1, wherein the second conductive path comprises a vendor specific function (VSF) pin.

18. The memory system of claim 1, wherein the second conductive path comprises a link startup speed (LSS) pin.

19. The memory system of claim 1, wherein the high-power mode comprises booting-up the memory system using a power budget that is greater than 500 mA.

20. The memory system of claim 1, wherein the high-power mode comprises booting-up the memory system using a power budget that is greater than 800 mA.

21. The memory system of claim 1, wherein the low-power mode comprises booting-up the memory system using a power budget that is less than or equal to 500 mA.

22. The memory system of claim 1, wherein the controller is further configured to cause the memory system to:
adjust a performance parameter of a plurality of performance parameters of the memory system in response to the memory system being booted according to the low-power mode, wherein the plurality of performance parameters comprises a clock speed and a communication rate associated with the first communication interface, wherein adjusting the performance parameter further comprises reducing the clock speed and the communication rate.

23. A method, comprising:
receiving, over a first conductive path of a second communication interface, a first indication to boot-up a memory system and a first communication interface associated with the memory system, the first communication interface comprising a plurality of conductive paths;
receiving, over a second conductive path of the second communication interface, a second indication of whether to perform a boot-up operation of the memory system using a low-power mode or a high-power mode based at least in part on receiving the first indication, wherein a value of the second indication is based least in part on whether a charge state of a power supply is sufficient to activate the memory system and the first communication interface in the high-power mode, and wherein receiving the second indication over the second conductive path of the second communication interface instead of the first communication interface prevents the memory system from entering a power reset loop when the charge state of the power supply is insufficient to activate the first communication interface in the high-power mode; and booting the memory system according to the low-power mode or the high-power mode based at least in part on receiving the second indication.

24. The method of claim 23, further comprising:

monitoring a power input of the memory system;

determining whether the power input satisfies a threshold; and switching from the low-power mode to the high-power mode based at least in part on the power input satisfying the threshold.

25. A non-transitory computer-readable medium storing code, the code comprising instructions executable by a processor to:

receive, over a first conductive path of a second communication interface, a first indication to boot-up a memory system and a first communication interface associated with the memory system, the first communication interface comprising a plurality of conductive paths;

receive, over a second conductive path of the second communication interface, a second indication of whether to perform a boot-up operation of the memory system using a low-power mode or a high-power mode based at least in part on receiving the first indication, wherein a value of the second indication is based least in part on whether a charge state of a power supply is sufficient to activate the memory system and the first communication interface in the high-power mode, and wherein receiving the second indication over the second conductive path of the second communication interface instead of the first communication interface prevents the memory system from entering a power reset loop when the charge state of the power supply is insufficient to activate the first communication interface in the high-power mode; and boot the memory system according to the low-power mode or the high-power mode based at least in part on receiving the second indication.

* * * * *